US012455722B2

(12) United States Patent
DiCecco et al.

(10) Patent No.: US 12,455,722 B2
(45) Date of Patent: Oct. 28, 2025

(54) FLOATING-POINT DECOMPOSITION CIRCUITRY WITH DYNAMIC PRECISION

(71) Applicant: Intel Corporation, Santa Clara, CA (US)

(72) Inventors: Roberto DiCecco, Toronto (CA); Joshua Fender, East York (CA); Shane O'Connell, Toronto (CA)

(73) Assignee: Altera Corporation, San Jose, CA (US)

( * ) Notice: Subject to any disclaimer, the term of this patent is extended or adjusted under 35 U.S.C. 154(b) by 3 days.

(21) Appl. No.: 18/399,381

(22) Filed: Dec. 28, 2023

(65) Prior Publication Data

US 2024/0126506 A1    Apr. 18, 2024

Related U.S. Application Data

(63) Continuation of application No. 16/818,889, filed on Mar. 13, 2020.

(51) Int. Cl.
| | |
|---|---|
| *G06F 7/485* | (2006.01) |
| *G06F 7/483* | (2006.01) |
| *G06F 7/487* | (2006.01) |
| *G06F 7/499* | (2006.01) |
| *G06F 7/544* | (2006.01) |
| *G06F 17/16* | (2006.01) |

(52) U.S. Cl.
CPC ............. *G06F 7/485* (2013.01); *G06F 7/483* (2013.01); *G06F 7/4876* (2013.01); *G06F 7/49947* (2013.01); *G06F 7/5443* (2013.01); *G06F 17/16* (2013.01)

(58) Field of Classification Search
CPC .... G06F 7/483; G06F 7/49947; G06F 7/5443; G06F 17/16
See application file for complete search history.

(56) References Cited

U.S. PATENT DOCUMENTS

| | | |
|---|---|---|
| 5,053,987 A | 10/1991 | Genusov et al. |
| 5,764,556 A | 6/1998 | Stiles |
| 5,933,360 A | 8/1999 | Larson |
| 6,282,634 B1 | 8/2001 | Hinds et al. |

(Continued)

OTHER PUBLICATIONS

I. Grout, 'Chapter 5—Introduction to Digital Logic Design', in Digital Systems Design with FPGAs and CPLDs, I. Grout, Ed. Burlington: Newnes, 2008, pp. 217-331. (Year: 2008).

(Continued)

*Primary Examiner* — Michael D. Yaary
(74) *Attorney, Agent, or Firm* — Fletcher Yoder, P.C.

(57) ABSTRACT

Circuitry for decomposing block floating-point numbers into lower precision floating-point numbers is provided. The circuitry may include a high precision storage circuit configured to provide high precision floating-point numbers, input selectors configured to receive the high precision floating-point numbers from the high precision storage circuit and to generate corresponding lower precision floating-point components with adjusted exponents, and a low precision block floating-point vector circuit configured to combine the various lower precision floating-point components generated by the input selectors. The lower precision floating-point components may be processed spatially or over multiple iterations over time.

20 Claims, 10 Drawing Sheets

(56) References Cited

U.S. PATENT DOCUMENTS

| | | |
|---|---|---|
| 7,865,541 B1 | 1/2011 | Langhammer |
| 8,166,091 B2 | 4/2012 | Swartzlander, Jr. et al. |
| 8,195,735 B2 | 6/2012 | Hansen et al. |
| 8,706,790 B1 | 4/2014 | Langhammer |
| 8,788,549 B2 | 7/2014 | Padaki et al. |
| 8,996,600 B1 | 3/2015 | Langhammer |
| 2010/0153830 A1 | 6/2010 | Gopal et al. |
| 2013/0191426 A1 | 7/2013 | Lau |
| 2018/0121168 A1* | 5/2018 | Langhammer ...... G06F 7/49915 |
| 2019/0042244 A1 | 2/2019 | Henry et al. |
| 2019/0339937 A1 | 11/2019 | Lo et al. |
| 2019/0340499 A1 | 11/2019 | Burger et al. |
| 2020/0193273 A1 | 6/2020 | Chung et al. |
| 2021/0103429 A1 | 4/2021 | Nair et al. |
| 2022/0334798 A1 | 10/2022 | Lin et al. |
| 2022/0350567 A1 | 11/2022 | Pan et al. |
| 2022/0366006 A1 | 11/2022 | Zhang et al. |

OTHER PUBLICATIONS

D. Goldberg, 'What Every Computer Scientist Should Know about Floating-Point Arithmetic', ACM Comput. Surv., vol. 23, No. 1, pp. 5-48, Mar. 1991. (Year: 1991).

K. Manolopoulos and D. Reisis, "An Efficient Multiple Precision Floating-Point Multiplier," in 2011 18th IEEE International Conference on Electronics, Circuits, and Systems, 2011, IEEE, pp. 153-156. (Year: 2011).

* cited by examiner

FLOATING-POINT DECOMPOSITION CIRCUITRY WITH DYNAMIC PRECISION

CROSS-REFERENCE TO RELATED APPLICATION

This application is a continuation of U.S. patent application Ser. No. 16/818,889, filed on Mar. 13, 2020, titled "FLOATING-POINT DECOMPOSITION CIRCUITRY WITH DYNAMIC PRECISION," which is hereby incorporated by reference in its entirety.

BACKGROUND

This invention relates generally to integrated circuits and, in particular, to programmable integrated circuits configured to support machine learning.

Programmable integrated circuits such as programmable logic devices (PLDs) include configurable logic blocks having look-up tables (LUTs) and adder based logic that are designed to allow a user to customize the circuitry to the user's particular needs. Conventional PLDs that are configured to support machine learning and deep learning are typically only capable of operating at a fixed precision, which forces a circuit design to be built with the highest require precision even if the highest precision is rarely used.

One way for accommodating two different precisions is to compile first configuration bitstream that supports one precision and a second configuration bitstream that supports another precision. This approach, however, requires a device reprogramming during execution to reconfigure the device using a different bitstream, which incurs significant latency penalty. Another approach involves partitioning a deep learning network across many PLDs each of which is programmed using a different configuration bitstream. This second approach, however, requires substantial and potentially redundant hardware overhead.

It is within this context that the embodiments described herein arise.

DETAILED DESCRIPTION

The present embodiments relate to circuitry that is capable of decomposing floating-point numbers (e.g., "block" floating-point numbers) into relatively lower precision floating-point numbers with adjusted exponents and mantissas. The adjusted exponents and mantissas are then either processed over multiple iterations over time or processed spatially in parallel. The term "block" floating-point refers to arithmetic operations that are performed on a group of floating-point numbers sharing the same exponent value. Floating-point numbers having a common exponent can be easily added without shifting and can thus provide significant hardware savings.

The integrated circuitry may include circuits for dynamically selecting how many bits of precision are needed to perform a given dot product operation. The decomposed floating-point numbers may be processed using a low fixed-precision matrix/vector unit such as a low precision dot product engine to generate a corresponding high precision output. Dot product engines implemented using lower precision arithmetic building blocks are technically advantageous because they map more effectively to the soft logic fabric within a programmable integrated circuit. Programmable integrated circuits implemented in this way to support machine learning such as deep learning models exhibit improved throughput by using the decomposing circuitry to dynamically support both high precision and low precision floating-point computations.

It will be recognized by one skilled in the art, that the present exemplary embodiments may be practiced without some or all of these specific details. In other instances, well-known operations have not been described in detail in order not to unnecessarily obscure the present embodiments.

Figure 1:
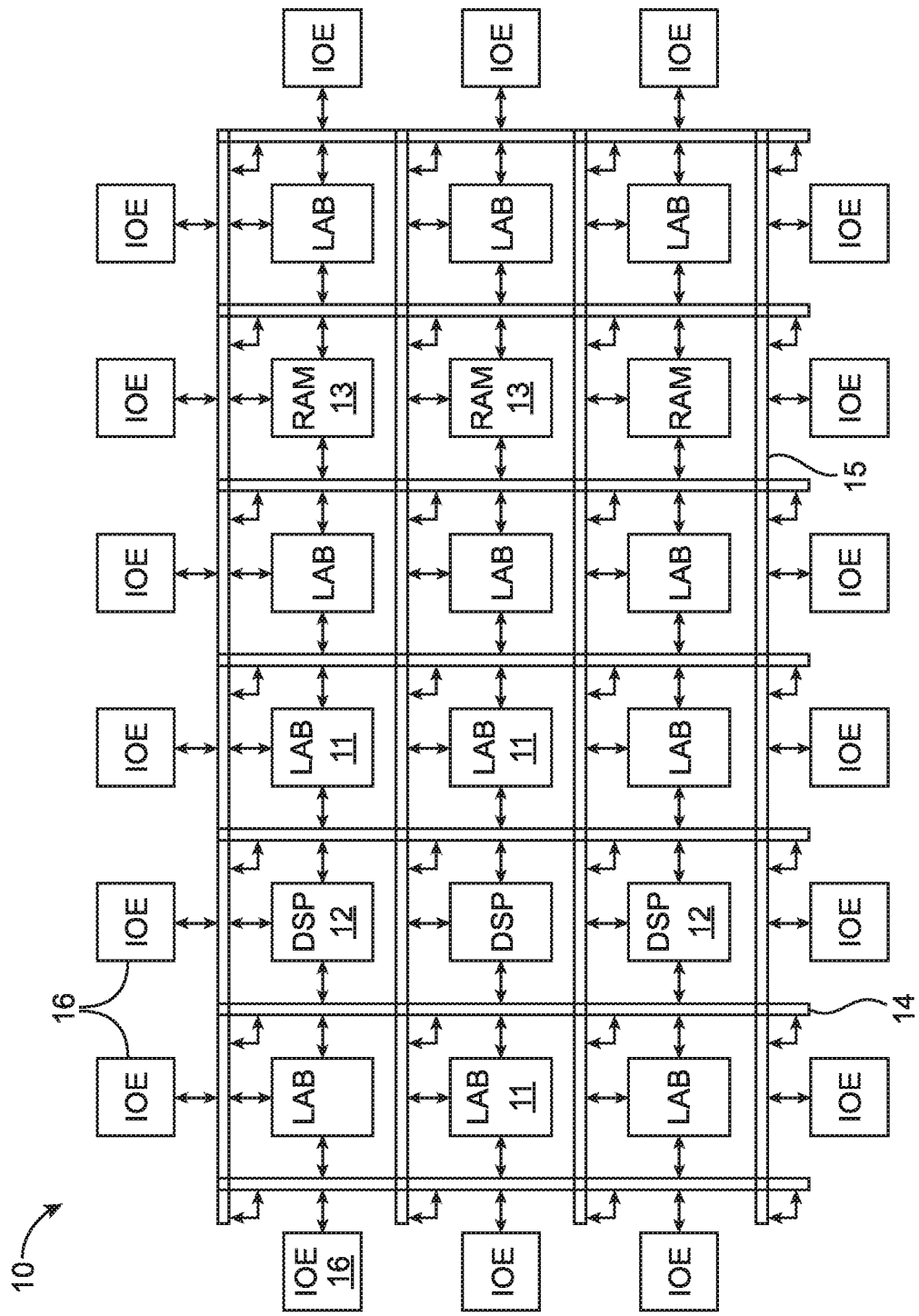
FIG. 1 is a diagram of an illustrative programmable integrated circuit in accordance with an embodiment.

With the foregoing in mind, FIG. 1 is a diagram of a programmable integrated circuit 10 (e.g., sometimes referred to as a programmable logic device, a field-programmable gate array or "FPGA", etc.). As shown in FIG. 1, programmable logic device 10 may include a two-dimensional array of functional blocks, including logic array blocks (LABs) 11 and other functional blocks such as random access memory (RAM) blocks 13 and specialized processing blocks such as digital signal processing (DSP) blocks 12 that are partly or fully hardwired to perform one or more specific tasks such as mathematical/arithmetic operations.

Functional blocks such as LABs 11 may include smaller programmable regions (e.g., logic elements, configurable logic blocks, or adaptive logic modules) that receive input signals and perform custom functions on the input signals to produce output signals. Device 10 may further include programmable routing fabric that is used to interconnect LABs 11 with RAM blocks 13 and DSP blocks 12. The combination of the programmable logic and routing fabric is sometimes referred to as "soft" logic, whereas the DSP blocks are sometimes referred to as "hard" logic. The type of hard logic on device 10 is not limited to DSP blocks and may include other types of hard logic. Adders/subtractors, multipliers, dot product computation circuits, and other arithmetic circuits which may or may not be formed as part of a DSP block 12 may sometimes be referred to collectively as arithmetic logic.

Programmable logic device 10 may contain programmable memory elements for configuring the soft logic. Memory elements may be loaded with configuration data (also called programming data) using input/output elements (IOEs) 16. Once loaded, the memory elements provide corresponding static control signals that control the operation of one or more LABs 11, programmable routing fabric, and optionally DSPs 12 or RAMs 13. In a typical scenario, the outputs of the loaded memory elements are applied to the gates of metal-oxide-semiconductor transistors (e.g., pass transistors) to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc. The logic gates and multiplexers that are part of the soft logic, configurable state machines, or any general logic component not having a single dedicated purpose on device 10 may be referred to collectively as "random logic."

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), programmable metallization cells (PMCs), conductive-bridging RAM (CBRAM), resistive memory elements, combinations of these structures, etc. Because the memory elements are loaded with configuration data during programming, the memory elements are sometimes referred to as configuration memory, configuration RAM (CRAM), configuration memory elements, or programmable memory elements.

In addition, programmable logic device 10 may use input/output elements (IOEs) 16 to drive signals off of device 10 and to receive signals from other devices. Input/output elements 16 may include parallel input/output circuitry, serial data transceiver circuitry, differential receiver and transmitter circuitry, or other circuitry used to connect one integrated circuit to another integrated circuit. As shown, input/output elements 16 may be located around the periphery of the chip. If desired, the programmable logic device may have input/output elements 16 arranged in different ways.

The routing fabric (sometimes referred to as programmable interconnect circuitry) on PLD 10 may be provided in the form of vertical routing channels 14 (i.e., interconnects formed along a vertical axis of PLD 10) and horizontal routing channels 15 (i.e., interconnects formed along a horizontal axis of PLD 10), each routing channel including at least one track to route at least one wire. If desired, routing wires may be shorter than the entire length of the routing channel. A length L wire may span L functional blocks. For example, a length four wire may span four functional blocks. Length four wires in a horizontal routing channel may be referred to as "H4" wires, whereas length four wires in a vertical routing channel may be referred to as "V4" wires.

Figure 2:
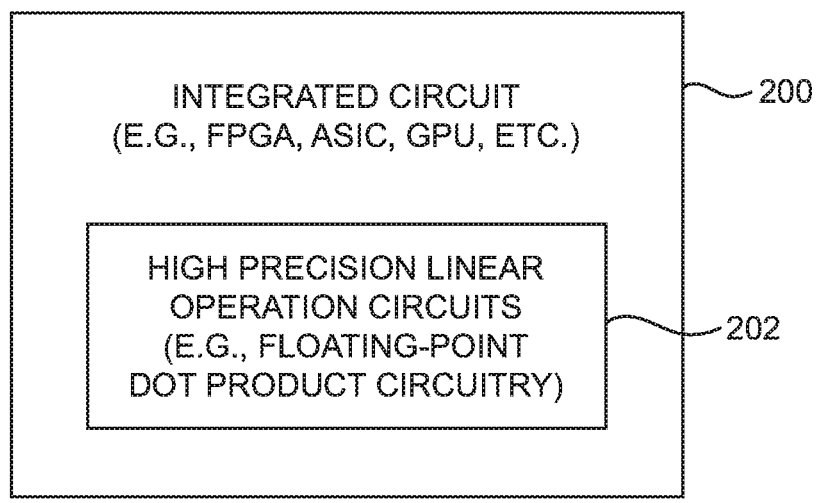
FIG. 2 is a diagram of an illustrative integrated circuit that includes high precision linear operation circuits in accordance with an embodiment.

Furthermore, it should be understood that the present embodiments may be implemented in any integrated circuit. FIG. 2 is a diagram of an illustrative integrated circuit die 200. Integrated circuit 200 may, for example, be a programmable integrated circuit such as device 10 of FIG. 1, a central processing unit (CPU), a graphics processing unit (GPU), an application-specific integrated circuit (ASIC), an application specific standard product (ASSP), a microcontroller, a microprocessor, etc. Examples of programmable integrated circuits include programmable logic devices (PLDs), field programmable gate arrays (FPGAs), programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), and complex programmable logic devices (CPLDs), just to name a few.

As shown in FIG. 2, integrated circuit may include circuits such as circuits 202 configured to perform high precision linear operations. Device configurations in which floating-point dot products are being computed may sometimes be described herein as an example. Dot product operations may be prevalent in machine learning application such as deep learning networks. This is, however, merely illustrative. If desired, high precision linear operation circuits 202 may also be used to perform other linear arithmetic operations that require multiplication, division, addition, subtraction, and/or other manipulation of numbers required in any type of machine learning neural network.

The term "high" or "higher" precision may refer to floating-point operations involving mantissa widths that are equal to or greater than 7, between seven and ten, equal to or greater than 10, between 10 and 23, equal to or greater than 23, etc. The term "low" or "lower" precision may refer to floating-point operations involving mantissa widths that are less than 10, between 10 and 7, less than 7, 6 or less, 5 or less, 4 or less, 3 or less, 2 or less, etc. The term mantissa bits, fractional bits, and significand bits may have the same meaning and can be used interchangeably.

Figure 3:
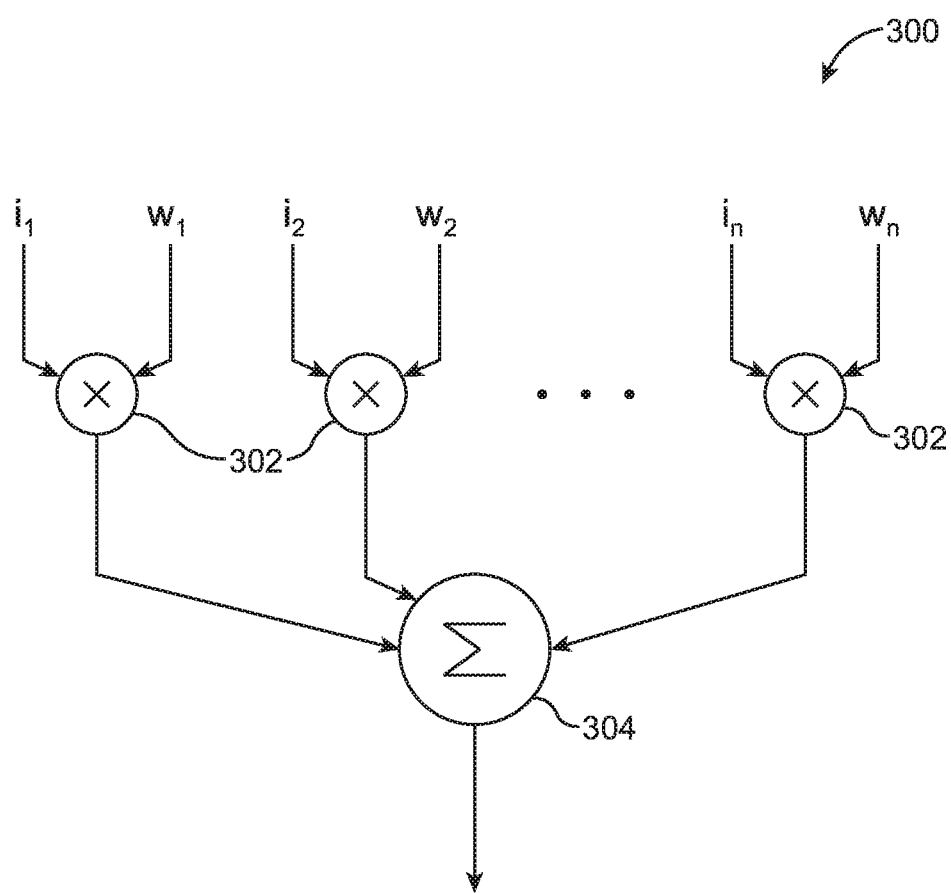
FIG. 3 is a diagram of an illustrative dot product circuit in accordance with an embodiment.

FIG. 3 is a diagram of an illustrative n-element dot product circuit 300. As described above, the operations of dot product circuit 300 may be performed using circuits 202 of FIG. 2. As shown in FIG. 3, dot product circuit 300 may receive n-element input vectors i and w, and may include a first multiplier 302 for computing the product of inputs $i_1$ and $w_1$, a second multiplier 302 for computing the product of inputs $i_2$ and $w_2$, . . . , and an n-th multiplier 302 for computing the products of inputs $i_n$ and $w_n$. Dot product circuit 300 may further include a separate summation circuit 304 for adding together the n products generated by multipliers 302 to generate a final dot product output. In the example of FIG. 3, the multiplications performed by multipliers 302 occur in parallel and are then summed at adder 304. New input data can be received every clock cycle, and new output data can be generated every clock cycle after some fixed latency. In practice, however, dot product circuits need not actually be built using monolithic multipliers 302 and adder 304 in this way.

The dot product of size n illustrated in FIG. 3 can be represented using the following expression:

$$\text{output} = \Sigma_{k=1}^{n} i_k w_k \quad (1)$$

Each input $i_k$ and $w_k$ may represent a "high" precision floating-point number (e.g., an IEEE 754 half-precision floating-point number with one sign bit, 5 exponent bits, and 10 stored mantissa/fractional bits (sometimes referred to as an "FP16" number), a "BFLOAT16" number with one sign bit, 8 exponent bits, and 7 stored mantissa bits, an IEEE 754 single precision floating-point number with one sign bit, 8 exponent bits, and 23 stored mantissa bits (sometimes referred to as an "FP32" number, or other numbers with 7 or more bits of precision, 8 or more bits of precision, 9 or more bits of precision, 10 or more bits of precision, 16 or more bits of precision, 23 or more bits of precision, etc.

In accordance with an embodiment, circuitry is provided that can decompose the high precision input signals into two or more components. As an example, input i in expression (1) above can be decomposed into an upper (U) and a lower (L) component, yielding the following expression:

$$\text{output} = \Sigma_{k=1}^{n} (i_{kU} + i_{kL}) * w_k \quad (2)$$

where $i_{kU}$ represents the upper decomposed component and where $i_{kL}$ represents the lower decomposed component. This result can be further grouped into two separate dot products of size n as follows:

$$\text{output} = \Sigma_{k=1}^{n} i_{kU} * w_k + \Sigma_{k=1}^{n} i_{kL} * w_k \qquad (3)$$

This decomposition example is merely illustrative. In general, the dot product operation of expression (1) may be decomposed into three or more smaller dot product groups, four or more smaller dot product groups, or any desired number of smaller lower precision dot product groups by decomposing input i and/or input w depending on the needs of the application into multiple "low" precision components (e.g., a decomposed value with one sign bit, 4 exponent bits, and 3 stored significand bits, a decomposed value with fewer than 7 significand bits, a decomposed value with fewer than 6 significand bits, a decomposed value with fewer than 5 significand bits, or other signals with less than 8 bits of precision, with less than 4 bits of precision, with less than 3 bits of precision, with less than 2 bits of precision, etc.).

Figure 4:
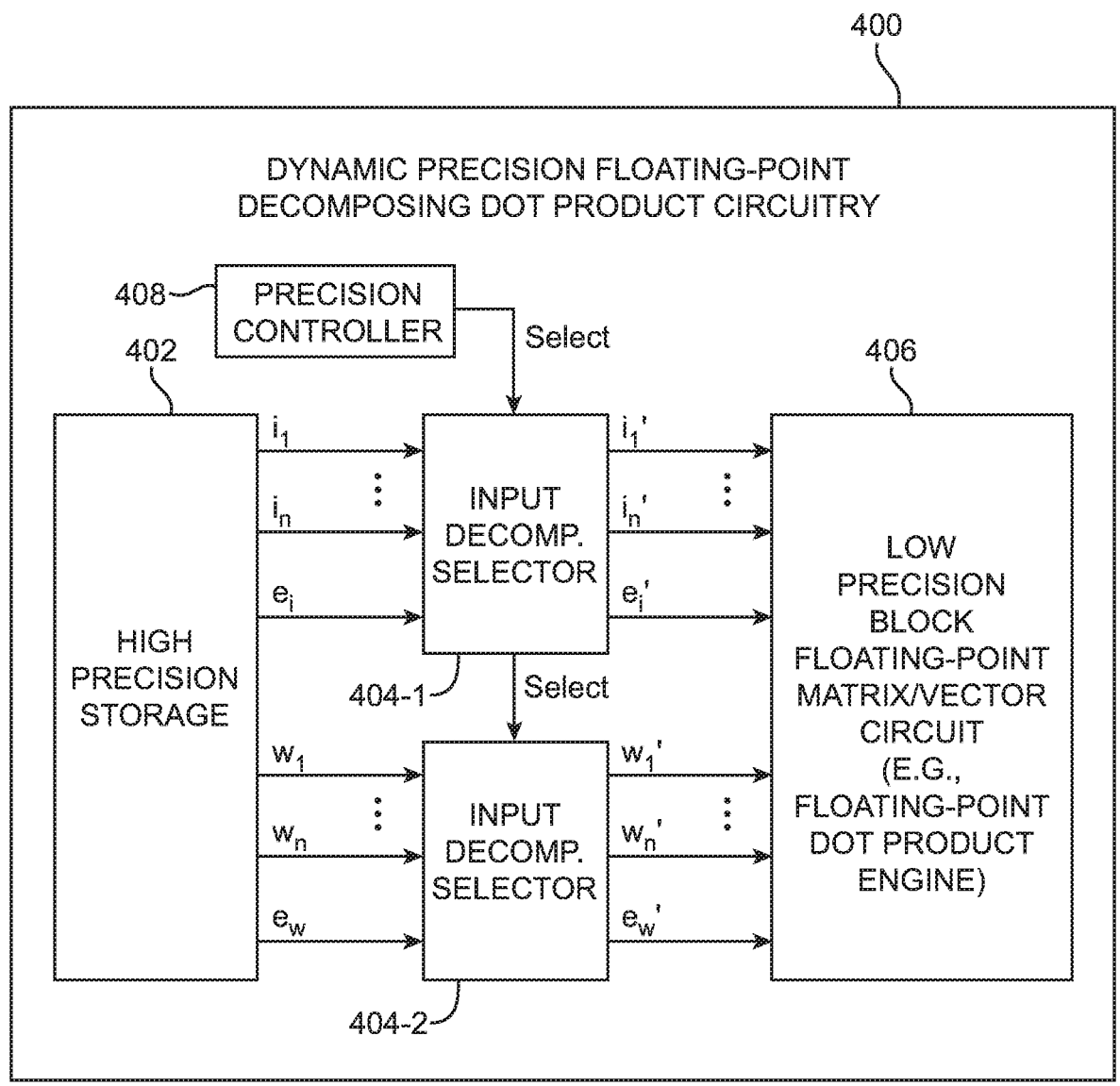
FIG. 4 is a diagram of illustrative dynamic precision floating-point decomposing dot product circuitry in accordance with an embodiment.

FIG. 4 is a diagram of illustrative dynamic precision floating-point decomposing dot product circuitry such as circuitry 400. Circuitry 400 may be part of circuits 202 of FIG. 2 and may be configured to perform dot product arithmetic by decomposing high precision block floating-point numbers into corresponding low precision components. As shown in FIG. 4, dynamic precision floating-point decomposition dot product circuitry 400 may include a high precision storage circuit 402 configured to store the high precision input vectors i and w. In the example of FIG. 4, each of inputs i and w can be decomposed using a separate input decomposing selection circuit.

Circuitry 400 may include a first input decomposition selector 404-1 configured to receive inputs $[i_1:i_n]$ along with the associated exponent $e_i$. Input selector 404-1 may be controlled by a select signal generated by a controller such as precision controller 408 and may output corresponding low precision components $[i_1':i_n']$ and an adjusted exponent value $e_i'$. In general, $i_k'$ may represent any fractional subset or portion of $i_k$ as long as $i_k'$ has fewer precision bits than $i_k$.

Similarly, circuitry 400 may further include a second input decomposition selector 404-2 configured to receive inputs $[w_1:w_n]$ along with the associated exponent $e_w$. Input selector 404-2 may also be controlled by the select signal generated by precision controller 408 and may output corresponding low precision components $[w_1':w_n']$ and an adjusted exponent value $e_w'$. In general, $w_k'$ may represent any fractional subset or portion of $w_k$ so long as $w_k'$ has fewer precision bits than $w_k$. Inputs $i_k$ and $w_k$ may have the same bit width or different bit widths depending on the application. Similarly, decomposed components $i_k'$ and $w_k'$ may have the same bit width of different bit widths depending on the application.

The decomposed input components output by the input selection circuits 404 may then be processed using a low precision block floating-point matrix/vector unit such as circuit 406. Circuit 406 may, as an example, be implemented as a floating-point dot product engine. In general, circuit 406 may be any suitable matrix or vector unit that can be used to combine multiple low precision signal components into a single output value for a linear arithmetic operation.

The term "block" floating-point herein may refer to floating-point arithmetic involving numbers of the same exponent value. For example, a block size of two would mean that input selector 404-1 would receive $i_1$ and $i_2$, both of which share a common exponent value $e_i$. As another example, a block size of four would mean that input selector 404-1 would receive $[i_1:i_4]$, all of which share a common exponent value $e_i$. As yet another example, a block size of 16 would mean that input selector 404-1 would receive $[i_1:i_{16}]$, all of which share a common exponent value $e_i$. In other words, the block size would dictate the bus widths for inputs i and w, which would also determine the width of the dot product. A block size of one represents the standard floating-point representation where the bus width of i and w are both one.

The example of FIG. 4 where both inputs i and w are decomposed using input decomposing selectors is merely illustrative. In another suitable arrangement, the high precision inputs $[i_1:1_n]$ may be fed directly as inputs into block floating-point matrix circuit 406 while inputs w are decomposed using input selector 404-2. In yet another suitable arrangement, high precision inputs $[w_1:w_n]$ may be fed directly as inputs into block floating-point vector circuit 406 while inputs i are decomposed using input selector 404-1. In other words, only one of input signals i or w may be decomposed, or both of input signals i and w may be decomposed depending on the needs of the application.

Figure 5:
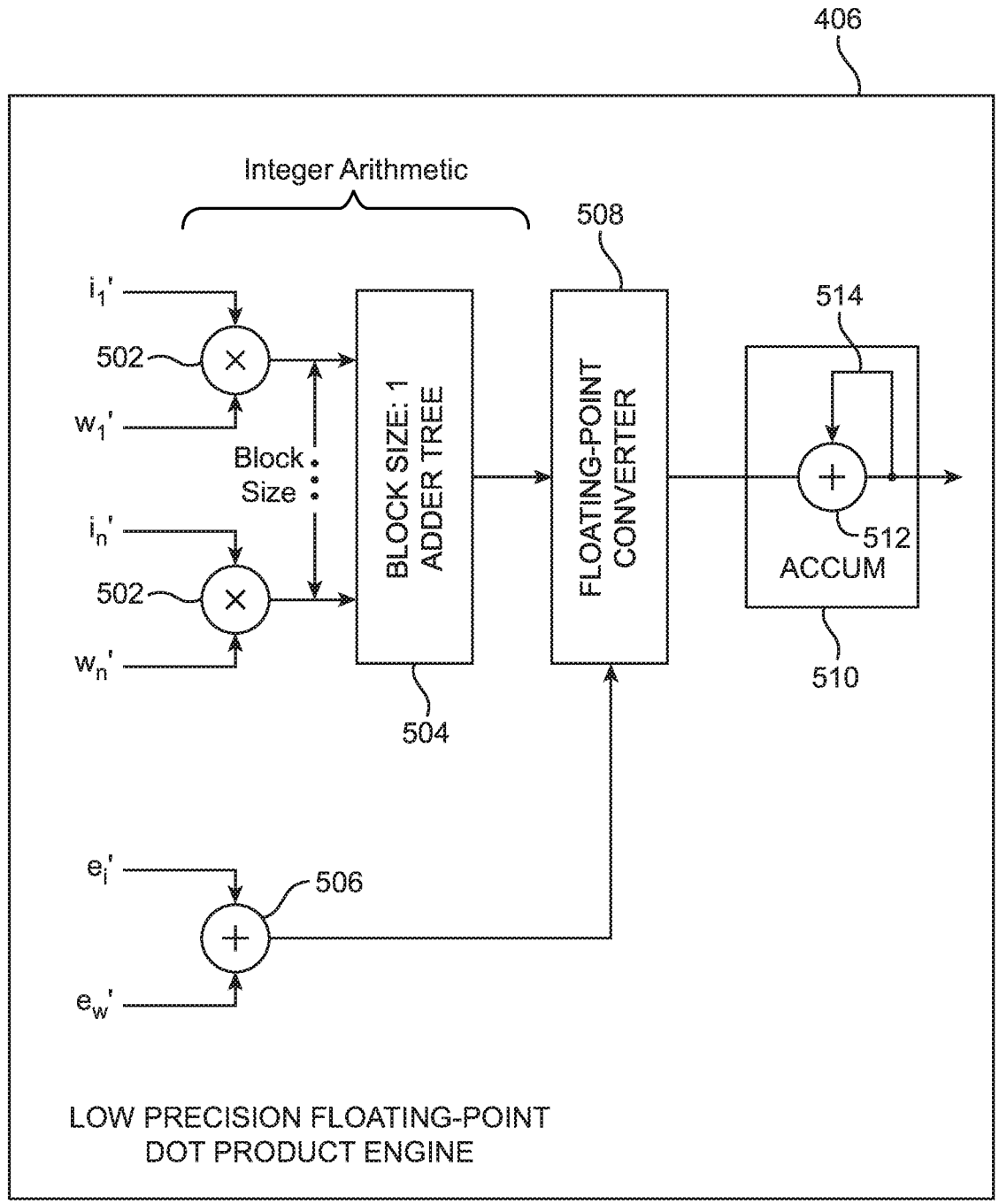
FIG. 5 is a diagram of an illustrative low precision floating-point dot product circuit in accordance with an embodiment.

FIG. 5 is a diagram of circuit 406 implemented as a low precision floating-point dot product engine. As shown in FIG. 5, dot product engine 406 may include n low precision multiplier circuits 502 for computing the input product pairs $i_1'*w_1'$, $i_2'*w_2'$, and $i_n'*w_n'$. The number of multipliers 502 will depend on the floating-point block size. The resulting products output by multipliers 502 may be combined at a block-size:1 adder tree 504, which effectively sums the products from the n buses. The adjusted exponent values $e_i'$ and $e_w'$ may be added using circuit 506. Integer arithmetic signals output from adder tree 504 and the exponent sum output from adder circuit 506 may arrive at converter 508, which are then converted to a final floating-point dot product output value. The dot product value output by floating-point converter circuit 508 may be optionally accumulated using accumulator circuit 510, which includes an adder circuit 512 and an output feedback path 514.

Figure 6:
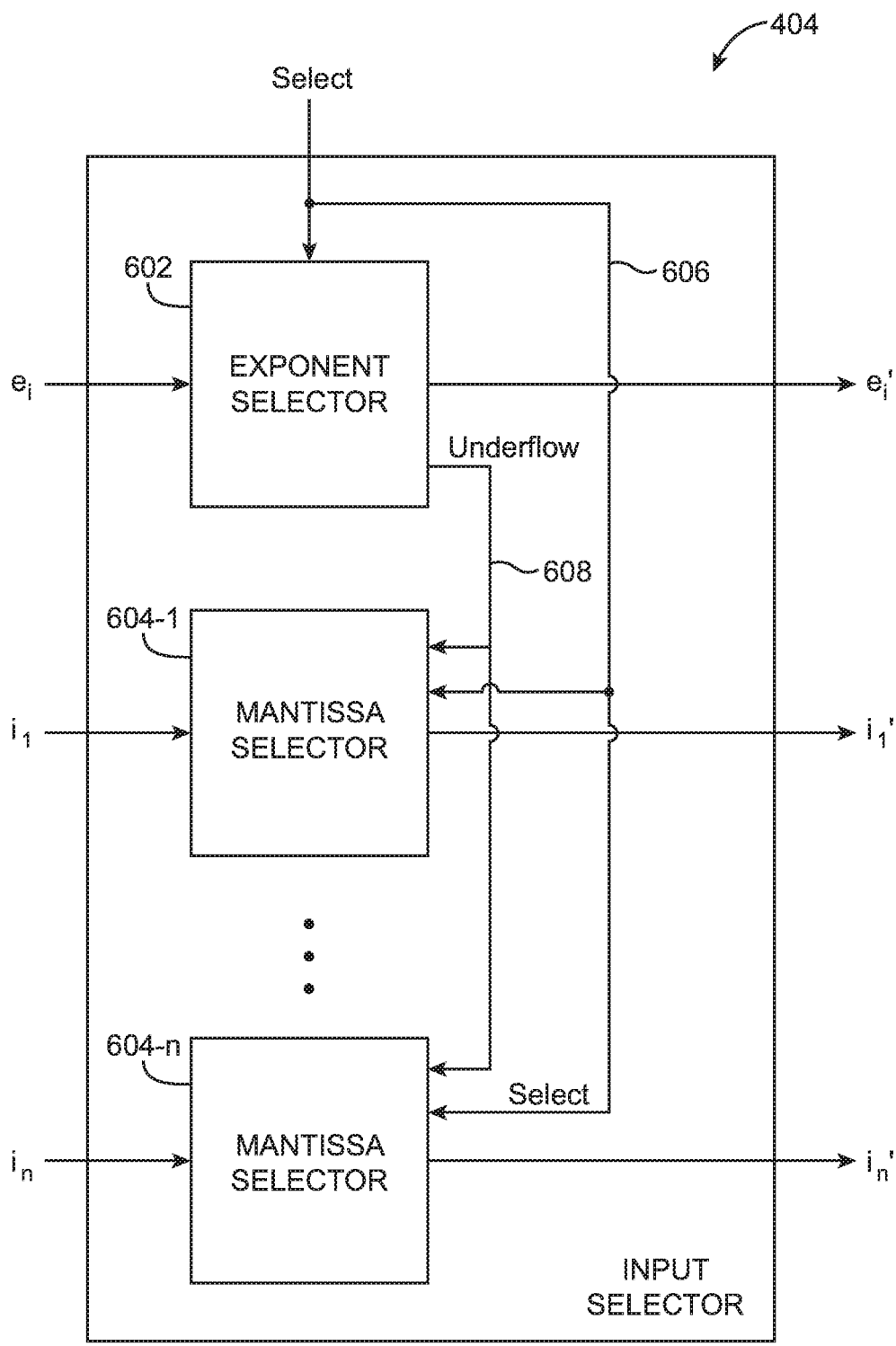
FIG. 6 is a diagram of an illustrative input selection circuit in accordance with an embodiment.

FIG. 6 is a diagram of an illustrative input selection circuit 404. As shown in FIG. 6, input selector 404 may include an exponent selection circuit such as exponent selector 602, and one or more mantissa selection circuits such as mantissa selector 604-1, . . . , 604-n. Exponent selector 602 may receive input exponent $e_i$ and the select signal (e.g., the select signal generated by controller 408 in FIG. 4) and may output an adjusted exponent $e_i'$ and an underflow signal. When there is an underflow, the underflow signal is driven to logic "0", and the output exponent $e_i'$ will be set to zero. When there is no underflow, the underflow signal is driven to logic "1", and a non-zero adjusted exponent value $e_i'$ will be generated by selector 602.

Each mantissa selector 604 may receive high precision input mantissa $i_k$, the select signal, and the underflow signal output from exponent selector 602 on path 608 and may output a decomposed component $i_k'$ having a smaller precision that the corresponding input $i_k$. In other words, the mantissa selector is used to select which portion of the high precision significand to output in the current cycle. For example, mantissa selector 604-1 may receive high precision input $i_1$ and output corresponding low precision decomposed value $i_1'$. Similarly, mantissa selector 604-n may receive high precision input in and output corresponding low precision decomposed component $i_n'$. A given selected output may be optionally rounded using any remaining high precision significand bits based on the select signal.

The example of FIG. 6 in which input selector 404 is configured to decompose high precision inputs i is merely illustrative. If desired, input selector 404 of the type shown in FIG. 6 may also be implemented for decomposing inputs w or other high precision input signals.

Figure 7:
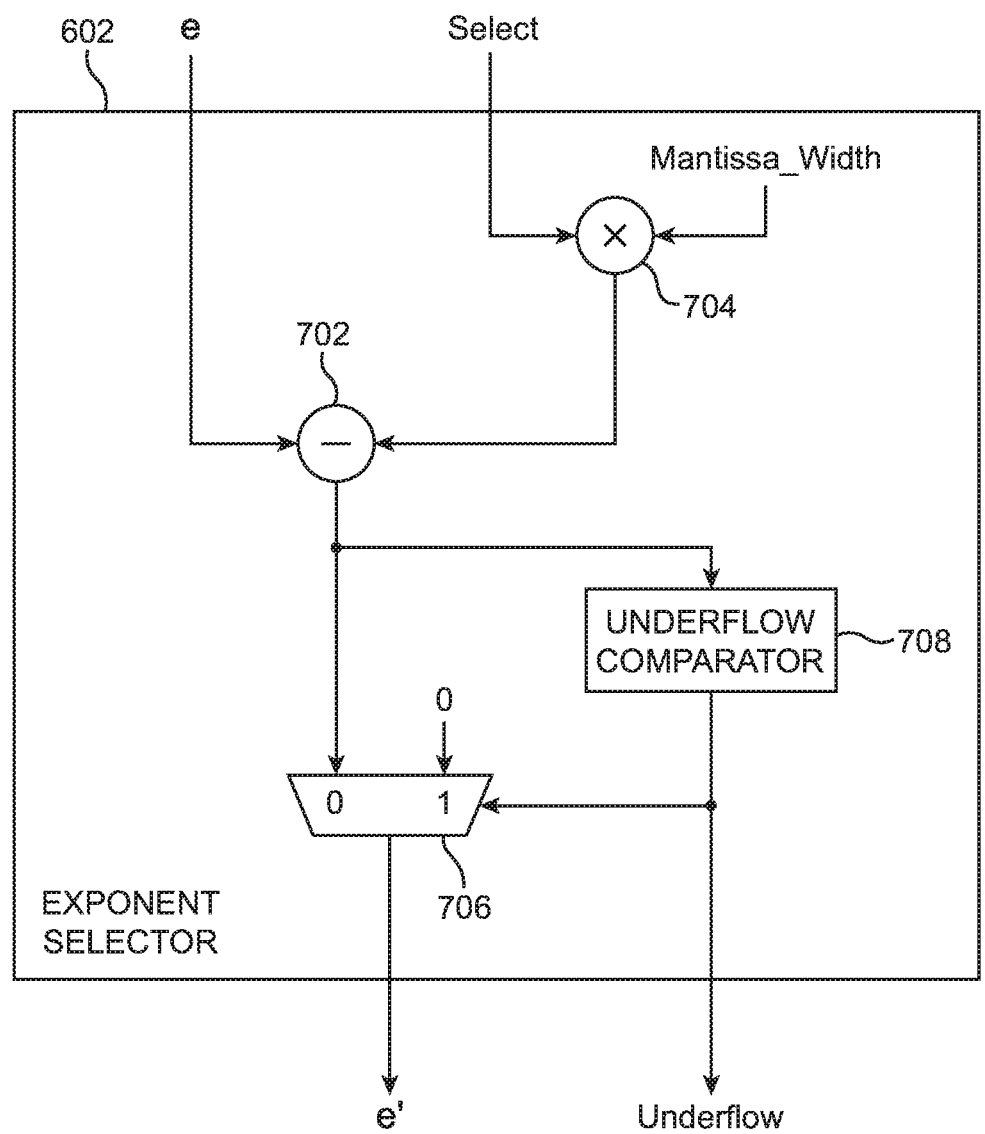
FIG. 7 is a diagram of an illustrative exponent selection circuit in accordance with an embodiment.

FIG. 7 is a diagram showing one suitable implementation of exponent selection circuit 602. As shown in FIG. 7, exponent selector 602 may include a multiplier circuit 704 configured to compute the product of the select signal and a low precision mantissa width (denoted as "Mantissa_Width"), a subtraction circuit 702 configured to compute the difference between input exponent value e and the product output from multiplier 704, an underflow comparison circuit such as underflow comparator 708 for determining whether the difference value output from subtractor 702 underflows, and a switching circuit such as multiplexing circuit 706 having a first (0) data input configured to receive the difference value from subtractor 702, a second (1) data input configured to receive a "0", a control input configured to receive the underflow signal from comparator 708, and an output on which an adjusted exponent value e' is generated. The underflow signal may also be provided as an output of exponent selector 602. The Mantissa_Width value may be defined as the predetermined width of the significand supported by the dot product engine (e.g., the low precision width of circuit 406 in FIGS. 4 and 5). Configured in this way, exponent selector 602 is configured to generate a new exponent e' for each low precision portion of the input mantissa (as the value of the select signal changes). As already described above, the output exponent e' will be flushed to zero in the case of underflow.

Figure 8:
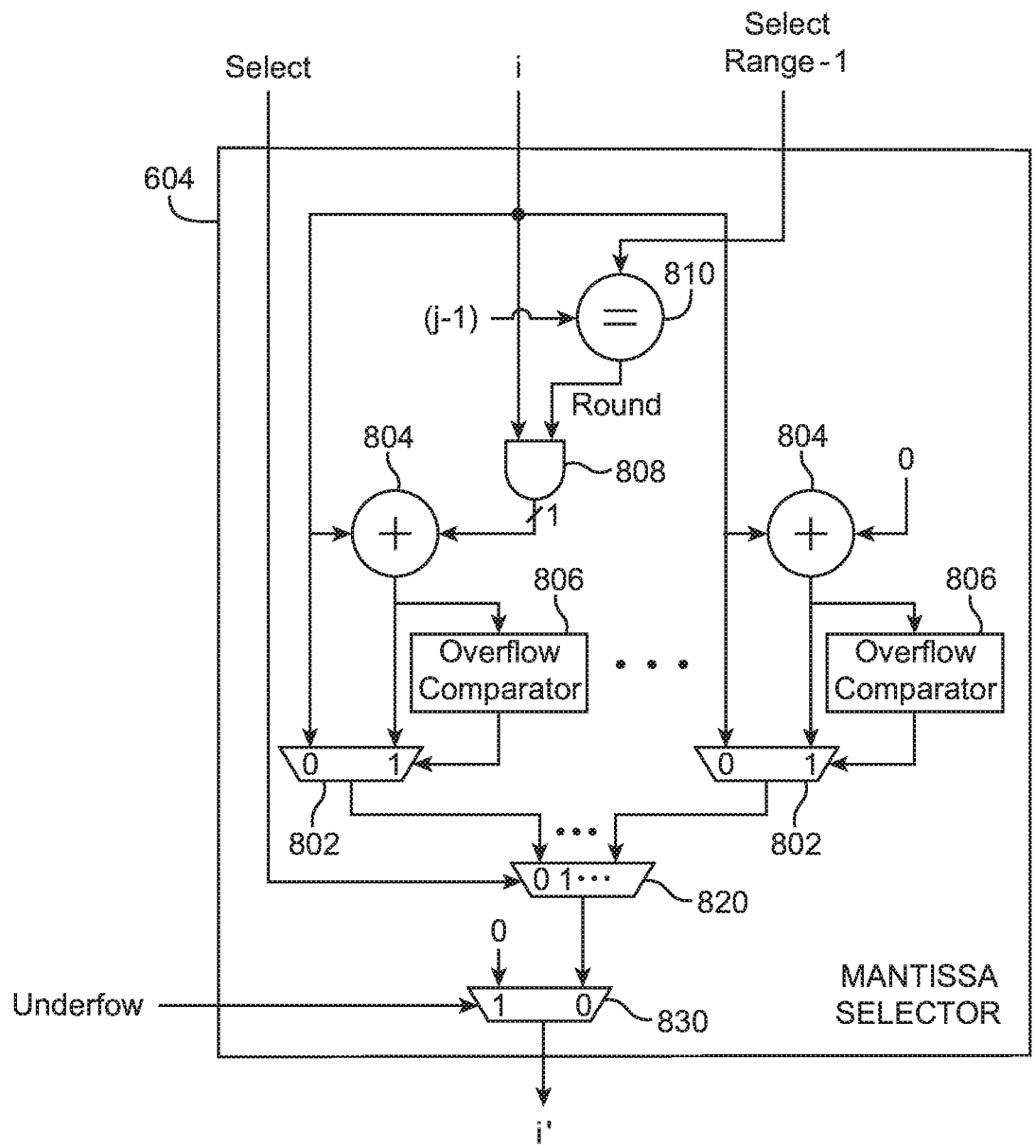
FIG. 8 is a diagram of an illustrative mantissa selection circuit in accordance with an embodiment.

FIG. 8 is a diagram of an illustrative mantissa selection circuit 604 that is used to select which portion of the high precision input mantissa to output to the low precision block floating-point vector unit. As shown in FIG. 8, mantissa selector 604 may include a number of sub-circuits each processing one possible low precision mantissa. The bit width of the low precision output mantissa i' is set by the Mantissa_Width as defined above in connection with FIG. 7.

A first sub-circuit may have a first multiplexer 802 having a first (0) data input configured to receive a first portion of high precision input significand i, a second (1) data input configured to receive a sum produced from adder 804 (which adds together input i with "0"), a control input configured to receive an overflow signal output from a first overflow comparator 806 (which determines whether the output of adder 804 has overflowed), and a corresponding multiplexer output with a bit width determined by Mantissa_Width.

Each of the remaining sub-circuits may have its own separate multiplexer 802 having a first (0) data input configured to receive a respective portion of input significand i, a second (1) data input configured to receive a sum produced from adder 804 (which adds together the respective portion of i with a respective computed rounding bit), a control input configured to receive an overflow signal output from the associated overflow comparator 806 (which determines whether the output of adder 804 in that sub-circuit has overflowed), and a corresponding multiplexer output with a bit width set by Mantissa_Width.

The rounding bit may be generated by an associated rounding logic circuit in that sub-circuit, which includes a comparator circuit 810 that determines whether (j−1) is equal to a "select range" minus 1. The term "select range" may be defined as the maximum programmed range of the select signal (i.e., the total possible number of values of the select signal). For example, if the mantissa selector is configured to perform two iterations, then the select range will be equal to two (i.e., the select signal can be 0 or 1). As another example, if the mantissa selector is configured to perform only one iteration, then the select range will be equal to one (i.e., the select signal can only be 0).

The variable j may correspond to the index of a given portion of the circuit. Thus, if mantissa selector can produce four different mantissa portions, parameter j will be equal to 1, 2, 3, or 4 for each of the mantissa portions. Therefore, if the select range and j are both equal to 1, comparator 810 will generate a high output signal (since j−1 will be equal to select range minus 1). The sub-circuit may further include a logic AND gate 808 configured to receive the output signal from comparator 810 and the remaining bits of the high precision significand. Logic AND gate 808 may output an asserted rounding bit only when the output of comparator 810 is high and when at least one of the bits in the received mantissa portion is high. Otherwise, logic AND gate 808 will output a low rounding bit to the corresponding adder 804 in that sub-circuit. In the example above where select range and j are both equal to 1, rounding will be enabled for the first mantissa component, while the remaining components (2, 3, 4) will not produce a rounded result.

The multiplexer output of each sub-circuit may be received at multiplexing circuit 820, which selects from one of the optionally rounded mantissa portions depending on the value of the select signal. Mantissa selector 604 may further include an underflow multiplexer 830 having a first (0) data input configured to receive an output signal from multiplexer 820, a second (1) data input configured to receive a logic "0", a control input configured to receive the underflow signal from exponent selector 602 (see, e.g., FIG. 6), and an output on which low precision mantissa i' is provided. Thus, output mantissa i' will be equal to zero in the case of underflow.

For example, consider a scenario where the original high precision mantissa input to the mantissa selector has bits $m_7m_6m_5m_4m_3m_2m_1m_0$, the precision of the dot product engine is 4 bits (i.e., Mantissa_Width=4), and the select range is equal to 2 because the application requires all 8 bits of precision. Here, there can be two possible decompositions. Since select range is equal to two, the select signal can only be 0 or 1. When the select signal is equal to 0, the mantissa selector will produce $m_7m_6m_5m_4$ (i.e., the 4 most significant bits). When the select signal is equal to 1, the mantissa selector will produce $m_3m_2m_1m_0$ (i.e., the 4 least significant bits); no rounding will occur here because there are no remaining mantissa bits.

As another example, consider a different scenario where the original high precision mantissa input to the mantissa selector has bits $m_7m_6m_5m_4m_3m_2m_1m_0$, the precision of the dot product engine is 4 bits (i.e., Mantissa_Width=4), but the select range is set to 1 assuming the application can tolerate or only needs 4 bits of precision. Since select range is equal to one, the select signal can only be 0. When the select signal is equal to 0, the mantissa selector will produce $m_7m_6m_5m_4$ plus a potential rounding bit. Here, j−1 will be equal to select range minus 1, so the rounding bit will be high only if $m_3$, $m_2$, $m_1$, or $m_0$ are high.

Let's now consider a numerical example where the block size is 2, and the precision of the dot product engine is 4 bits. Assume the two inputs to the input selector are:

$i0 = 1001\ 0001\ 0110$ $i1 = 1110\ 0011\ 1000$ where $e_i$ is equal to 12. If the application can tolerate 4 bits of precision, then the select range would be set to just 1 (i.e., the select signal is only equal to 0), and the input selector output would be equal to:

$$i0'=1001+1_{rounding}=1010$$

$$i1'=1110+1_{rounding}=1111$$

where $e_i$ is equal to 12 and where the +1 is the rounding of the remaining bits.

In the example above, if the application only needs 8 bits of precision, then the select range would be set to 2 (i.e., the select signal can be either 0 or 1). In this scenario, when the select signal is equal to 0, the input selector output would be equal to:

$$i0'=1001$$

$$i1'=1110$$

where $e_i=12$. The round signal would be low for this sub-circuit.

When the select signal is equal to 1, the input selector output would be equal to:

$$i0'=0001+1_{rounding}=0010$$

$$i1'=0011+1_{rounding}=0100$$

where $e_i=12$ and where the +1 is the rounding of the remaining bits. The last sub-circuit never sends out a result because the select signal is only ever set to 0 or 1 in this application usage case.

In the example above, if the application requires all 12 bits of precision, then the select range would be set to 3 (i.e., the select signal can be either 0, 1, or 2). In this scenario, when the select signal is equal to 0, the input selector output would be equal to:

$$i0'=1001$$

$$i1'=1110$$

where $e_i=12$. The round signal would be low for this sub-circuit.

When the select signal is equal to 1, the input selector output would be equal to:

$$i0'=0001$$

$$i1'=0011$$

where $e_i=8$. The round signal would also be low for this sub-circuit.

When the select signal is equal to 2, the input selector output would be equal to:

$$i0'=0110$$

$$i1'=1000$$

where $e_i=4$. There is no rounding for the last sub-circuit because there are no remaining bits. The rounding scheme described above is merely illustrative and is not intended to limit the scope of the present embodiments. If desired, other rounding schemes such as round to the nearest even number, round to the nearest odd number, or perhaps no rounding might be implemented.

Figure 9:
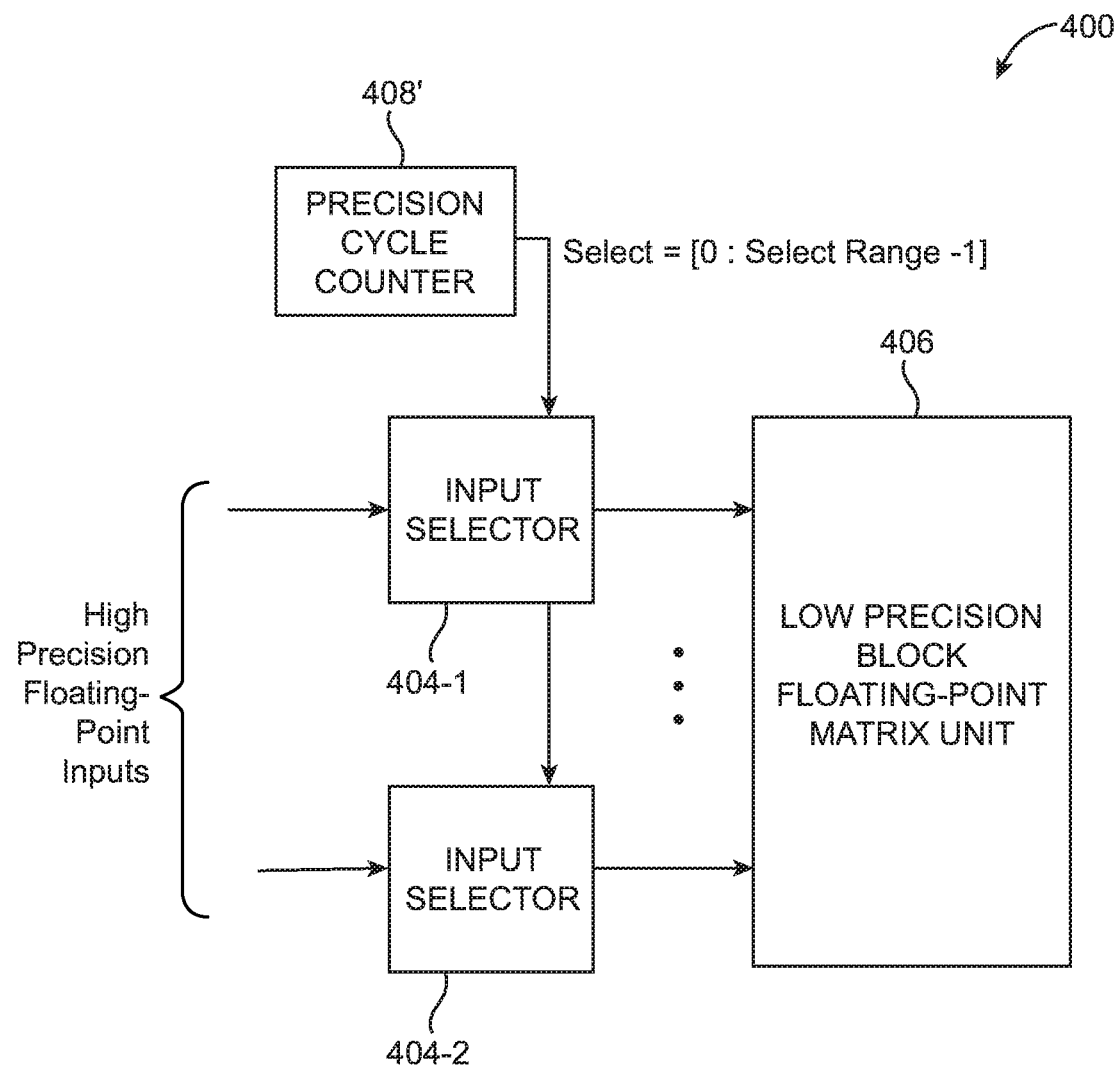
FIG. 9 is a diagram of illustrative floating-point dot product circuitry implementing precision decomposition over time in accordance with an embodiment.

The numerical examples described above illustrates decomposition over time (sometimes referred to as temporal or time-multiplexed decomposition). FIG. 9 is the high-level block diagram illustrating how decomposition over time may be implemented. As shown in FIG. 9, a control circuit such as precision cycle counter 408' may be used to drive the select signal, which can range from zero to select range minus one. Counter 408' effectively dictates the precision of the dot product and can be programmed to allow for difference precisions for different dot products. As examples, for a matrix unit 406 that supports a 4-bit block floating-point significand, then 1 cycle will yield 4 bits of precision while 2 cycles will yield 8 bits of precision, and so on.

Figure 10:
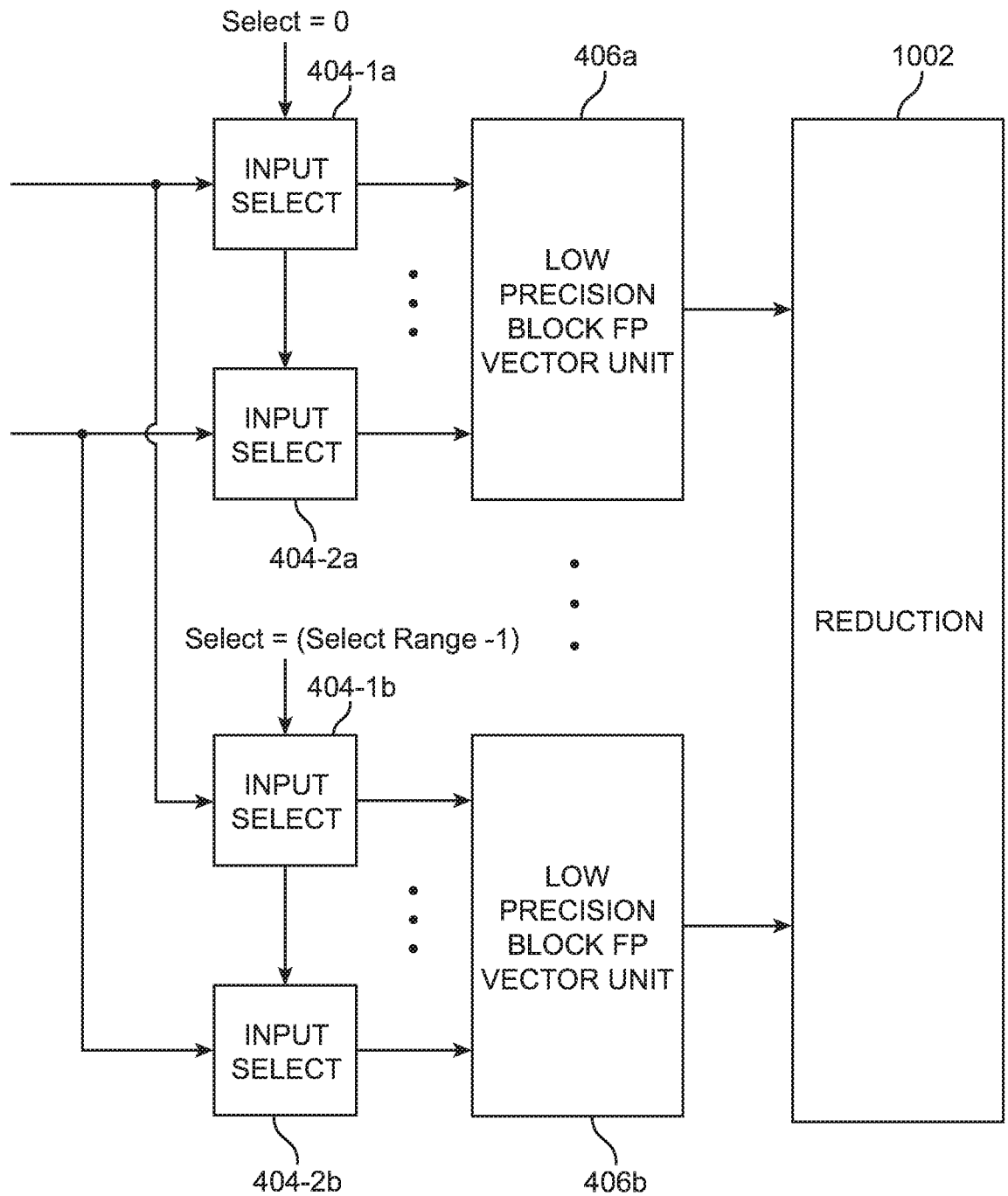
FIG. 10 is a diagram of illustrative floating-point dot product circuitry implementing spatial precision decomposition in accordance with an embodiment.

FIG. 10 illustrates yet another potential realization where multiple low precision matrix/vector units are used to process the various mantissa portions in parallel. As shown in FIG. 10, each matrix/vector unit receives a different decomposed component of the high precision number, which is then followed by a reduction stage 1002 to recombine the results. For instance, input selectors 404-1a associated with a select signal of 0 will be processed using a first low precision block floating-point vector unit 406a, whereas the input selectors 404-1b associated with a select signal of select range minus one will be processed using another low precision block floating-point vector unit 406b. This type of signal decomposition is sometimes referred to as "spatial" decomposition.

In general, the embodiments described above with respect to FIGS. 1-10 may be applied to any machine learning process, including but not limited to neural networks with 5-10 layers, less than 5 layers, 10-100 layers, 100-1000 layers, or more than 1000 layers, or may be applied to other computationally intensive algorithm. These embodiments may be optionally implemented as part of a system such as a data center or a data processing system for processing a variety of different requests (e.g., a data processing request to perform encryption, decryption, machine learning, video processing, voice recognition, image recognition, data compression, database search ranking, bioinformatics, network security pattern identification, spatial navigation, or some other specialized task). As other examples, these embodiments may applied be applied to a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

EXAMPLES

The following examples pertain to further embodiments.

Example 1 is circuitry, comprising: a storage circuit configured to output a floating-point number having a first precision; an input selection circuit configured to receive the floating-point number from the storage circuit and to decompose the received floating-point number into corresponding decomposed components having a second precision that is less than the first precision; and a floating-point vector circuit configured to receive the decomposed components from the input selection circuit.

Example 2 is the circuitry of example 1, wherein the storage circuit is optionally further configured to output an additional floating-point number having the first precision, and wherein the input selection circuit is optionally further configured to receive the additional floating-point number from the storage circuit and to decompose the additional floating-point number into corresponding decomposed components having the second precision.

Example 3 is the circuitry of example 2, wherein the floating-point number and the additional floating-point number optionally have the same exponent value.

Example 4 is the circuitry of any one of examples 1-3, wherein the storage circuit is further optionally configured to output an additional floating-point number, the circuitry optionally further comprising: an additional input selection circuit configured receive the additional floating-point number from the storage circuit and to decompose the additional floating-point number into corresponding decomposed components.

Example 5 is the circuitry of any one of examples 1-4, wherein the floating-point vector circuit optionally comprises a floating-point dot product engine.

Example 6 is the circuitry of any one of examples 1-5, wherein the floating-point vector circuit optionally comprises a block floating-point dot product engine.

Example 7 is the circuitry of any one of examples 1-6, wherein the floating-point vector circuit optionally comprises: a plurality of multiplier circuits; and an adder tree configured to receive signals from the plurality of multiplier circuits.

Example 8 is the circuitry of any one of examples 1-7, optionally further comprising: a precision controller configured to generate a select signal that is fed to the input selection circuit.

Example 9 is the circuitry of example 8, wherein the precision controller optionally comprises a precision cycle counter.

Example 10 is the circuitry of example 8, wherein the input selection circuit optionally comprises: an exponent selection circuit configured to receive an exponent of the floating-point number and to output a corresponding adjusted exponent; and a mantissa selection circuit configured to output the decomposed components having the second precision.

Example 11 is the circuitry of example 10, wherein the exponent selection circuit optionally comprises: a subtraction circuit configured to compute a difference between the received exponent and a number that is a function of the value of the select signal.

Example 12 is the circuitry of example 11, wherein the exponent selection circuit optionally further comprises: an underflow comparator; and a switching circuit configured to receive the computed difference from the subtraction circuit, to receive an underflow signal from the underflow comparator, and to output the adjusted exponent.

Example 13 is the circuitry of any one of examples 10-12, wherein the mantissa selection circuit optionally comprises: a plurality of sub-circuits each of which is configured to output a corresponding one of the decomposed components.

Example 14 is the circuitry of example 13, wherein at least one of the plurality of sub-circuits optionally comprises: an adder; rounding logic configured to output a rounding bit to the adder; an overflow comparator configured to receive signals from the adder; and a multiplexer configured to receive signals from the adder and the overflow comparator.

Example 15 is the circuitry of any one of examples 13-14, wherein the mantissa selection circuit optionally further comprises: a multiplexing circuit having data inputs configured to receive the decomposed components from the plurality of sub-circuits and a control input configured to receive the select signal from the precision controller.

Example 16 is circuitry operable to support an application, comprising: a circuit configured to provide floating-point numbers; and an input selector configured to decompose the floating-point numbers into corresponding lower precision components and to receive a select signal having a first select range when the application uses a first amount of precision and a second select range that is different than the first select range when the application uses a second amount of precision that is different than the first amount of precision.

Example 17 is the circuitry of example 16, wherein the lower precision components are optionally selectively rounded.

Example 18 is the circuitry of any one of examples 16-17, optionally further comprising: a precision cycle counter circuit configured to generate the select signal to implement decomposition over time.

Example 19 is circuitry, comprising: a first group of input selectors configured to receive high precision floating-point numbers and to generate corresponding first decomposed lower precision components; a first lower precision floating-point matrix circuit configured to receive the first decomposed lower precision components from the first group of input selectors; a second group of input selectors configured to receive the high precision floating-point numbers and to generate corresponding second decomposed lower precision components; and a second lower precision floating-point matrix circuit configured to receive the second decomposed lower precision components from the second group of input selectors.

Example 20 is the circuitry of example 19, optionally further comprising: a reduction circuit configured to combine signals generated from the first and second lower precision floating-point matrix circuits.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
    first circuitry configurable to:
        receive a first floating point number and a second floating point number; and
        dynamically choose a precision to convert the first floating point number and the second floating point number into a plurality of components, wherein the plurality of components has a precision less than a precision of at least one of the first floating point number or of the second floating point number; and
    second circuitry configurable to perform multiplication operations using the plurality of components.

2. The integrated circuit of claim 1, wherein the second circuitry comprises an accumulator.

3. The integrated circuit of claim 2, wherein the accumulator is configurable to generate an output by accumulating the plurality of components, the output having the precision greater than or equal to the precision of the first floating point number or the second floating point number.

4. The integrated circuit of claim 1, wherein the first circuitry comprises circuitry to dynamically select the precision of the plurality of components.

5. The integrated circuit of claim 1, wherein the plurality of components comprises a 2-bit mantissa or a 3-bit mantissa.

6. The integrated circuit of claim 1, wherein the integrated circuit is a graphics processing unit (GPU).

7. The integrated circuit of claim 1, comprising a memory configurable to store a plurality of floating point numbers in a first precision or a second precision.

8. The integrated circuit of claim 1, comprising input/output circuitry configurable for off-die communication.

9. The integrated circuit of claim 1, wherein the second circuitry is configurable to multiply a first component of the plurality of components and a second component of the plurality of components in parallel with a third component of the plurality of components and a fourth component of the plurality of components.

10. A method, comprising:
receiving, via processing circuitry, a first floating point number and a second floating point number from memory;
dynamically choosing, via the processing circuitry, a precision to convert the first floating point number and the second floating point number into a plurality of components, wherein the plurality of components has a precision less than a precision of a least one of the first floating point number or of the second floating point number; and
performing, via matrix multiply-accumulate circuitry, multiplication operations using the plurality of components.

11. The method of claim 10, wherein performing, via the matrix multiply-accumulate circuitry, the plurality of components comprises:
multiplying a first component of the plurality of components and a second component of the plurality of components; and
multiplying a third component of the plurality of components and a fourth component of the plurality of components at the same time.

12. The method of claim 10, wherein performing, via the matrix multiply-accumulate circuitry, the plurality of components comprises:
accumulating a first component of the plurality of components and a second component of the plurality of components; and
accumulating a third component of the plurality of components and a fourth component of the plurality of components in parallel.

13. The method of claim 10, wherein dynamically choosing, via the processing circuitry, the precision to convert the first floating point number and the second floating point number comprises:
generating a select signal indicative of the precision of the plurality of components.

14. The method of claim 13, wherein the precision of the plurality of components comprises a 2-bit mantissa or a 3-bit mantissa.

15. A data processing system, comprising:
a memory configurable to store a plurality of floating point numbers;
an integrated circuit configurable to support an operation, the integrated circuit comprising:
first circuitry configurable to:
receive a first floating point number of the plurality of floating point numbers and a second floating point number of the plurality of floating point numbers; and
dynamically choosing a precision to convert the first floating point number and the second floating point number into a plurality of components, wherein the plurality of components has a precision less than a precision of at least one of the first floating point number or the second floating point number; and
second circuitry configurable to perform multiplication operations using the plurality of components.

16. The data processing system of claim 15, wherein the second circuitry is an accumulator configurable to generate an output by accumulating the plurality of components, the output having the precision greater than or equal to the precision of the first floating point number or the second floating point number.

17. The data processing system of claim 15, wherein the first circuitry comprises circuitry configurable to comprises circuitry to dynamically select the precision of the plurality of components.

18. The data processing system of claim 15, wherein the second circuitry is configurable to perform the multiplication operations using a first component of the plurality of components and a second component of the plurality of components in parallel with a third component of the plurality of components and a fourth component of the plurality of components.

19. The data processing system of claim 15, wherein the plurality of components comprises a 2-bit mantissa or a 3-bit mantissa.

20. The data processing system of claim 15, wherein the integrated circuit is a graphics processing unit (GPU).

* * * * *